United States Patent
Frey et al.

(10) Patent No.: US 8,344,089 B2
(45) Date of Patent: Jan. 1, 2013

(54) BRANCHED POLYDIMETHYLSILOXANE-POLYOXYALKYLENE COPOLYMERS, A PROCESS FOR PREPARING THEM AND THEIR USE AS ANTI-MISTING ADDITIVES IN UV-CURING SILICONES

(75) Inventors: Julia Frey, Essen (DE); Rene Haensel, Dorsten (DE); Ingrid Eissmann, Gelsenkirchen (DE)

(73) Assignee: Evonik Goldschmidt GmbH, Essen (DE)

( * ) Notice: Subject to any disclaimer, the term of this patent is extended or adjusted under 35 U.S.C. 154(b) by 98 days.

(21) Appl. No.: 12/784,014

(22) Filed: May 20, 2010

(65) Prior Publication Data

US 2010/0298485 A1 Nov. 25, 2010

(30) Foreign Application Priority Data

May 20, 2009 (DE) .................. 10 2009 003 275

(51) Int. Cl.
*C08G 77/12* (2006.01)
(52) U.S. Cl. .......................... 528/31; 528/25
(58) Field of Classification Search ............ 528/31, 528/25
See application file for complete search history.

(56) References Cited

U.S. PATENT DOCUMENTS

| | | | |
|---|---|---|---|
| 3,836,560 A * | 9/1974 | Prokai et al. | 556/446 |
| 6,482,912 B2 | 11/2002 | Boudjouk et al. | |
| 6,506,810 B2 | 1/2003 | Borgogelli et al. | |
| 6,774,201 B2 | 8/2004 | Kilgour et al. | |
| 6,887,934 B2 | 5/2005 | Ferritto et al. | |
| 6,956,096 B2 | 10/2005 | Herzig et al. | |
| 7,635,581 B2 | 12/2009 | Ferenz et al. | |
| 2003/0096919 A1 | 5/2003 | Ichinohe | |
| 2004/0039132 A1 | 2/2004 | Ferritto et al. | |
| 2004/0097680 A1 | 5/2004 | Kilgour et al. | |
| 2009/0181439 A1 | 7/2009 | Thum et al. | |
| 2010/0056818 A1 | 3/2010 | Ferenz et al. | |

FOREIGN PATENT DOCUMENTS

| | | |
|---|---|---|
| CN | 1356349 A | 7/2002 |
| CN | 1678689 A | 10/2005 |
| DE | 10312636 A1 | 9/2004 |
| DE | 102006005100 A1 | 8/2007 |
| DE | 102007055485 A1 | 6/2009 |
| DE | 102008004726 A1 | 7/2009 |
| DE | 102008041601 A1 | 3/2010 |
| EP | 1277786 A1 | 1/2003 |
| EP | 1439200 A1 | 7/2004 |
| EP | 1520870 A1 | 4/2005 |
| EP | 1481018 B1 | 11/2006 |
| JP | 8157601 | 6/1996 |
| WO | WO03074591 A1 | 9/2003 |

OTHER PUBLICATIONS

Office Action issued by the Chinese Patent Office on Jul. 26, 2012 in a corresponding foreign application and an English-language translation thereof.

* cited by examiner

*Primary Examiner* — Kuo-Liang Peng
(74) *Attorney, Agent, or Firm* — Scully, Scott, Murphy & Presser, P.C.

(57) ABSTRACT

The present invention relates to branched polydimethylsiloxane-polyoxyalkylene copolymers, to a process for preparing them and to their use as anti-misting additives in silicone release coatings.

15 Claims, 1 Drawing Sheet

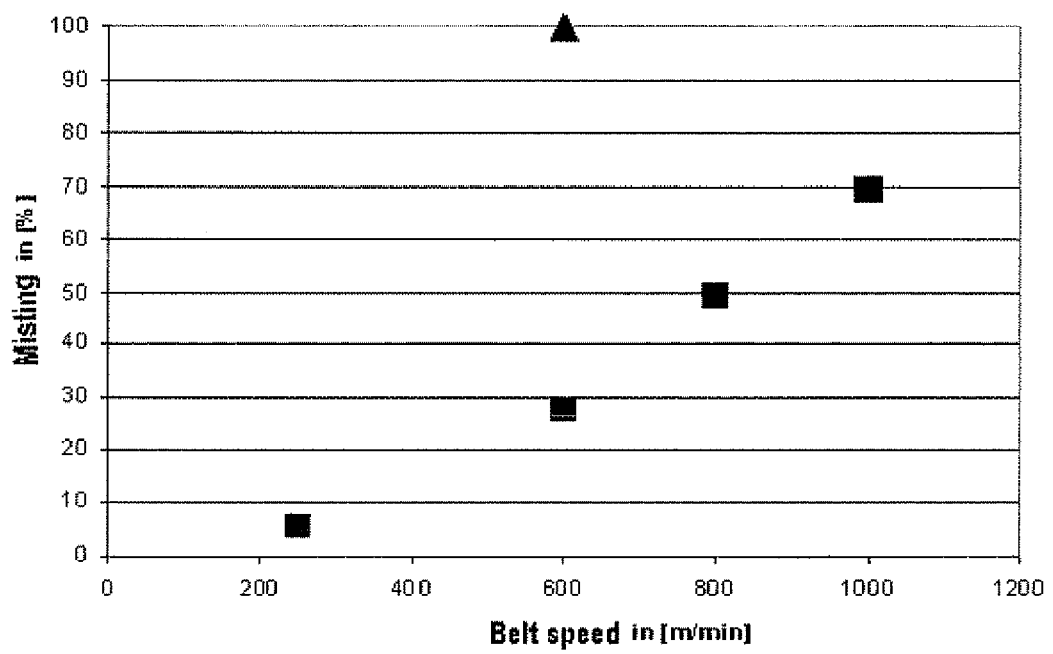

BRANCHED POLYDIMETHYLSILOXANE-POLYOXYALKYLENE COPOLYMERS, A PROCESS FOR PREPARING THEM AND THEIR USE AS ANTI-MISTING ADDITIVES IN UV-CURING SILICONES

FIELD OF THE INVENTION

The invention relates to branched polydimethylsiloxane-polyoxyalkylene copolymers, and to a process for preparing branched polydimethylsiloxane-polyoxyalkylene copolymers. The present invention also relates to the use of branched polydimethylsiloxane-polyoxyalkylene copolymers as anti-misting additives in silicone release coatings.

BACKGROUND

In the silicone coatings industry, siloxanes are applied by means of rollers to sheet substrate materials such as film or paper. In order to raise the productivity, there is a trend towards increasing the machine speed. Spray mists are formed on the silicone applicator units at belt speeds of more than 300 m/min. The misting results in a loss of coating material, and the ambient air becomes loaded with the spray mist. The formation of spray mist can be reduced by the addition of anti-misting additives.

Silicone release coatings are cured either thermally or by radiation. With radiation curing, a distinction is made between cationic or free-radical polymerization. Available commercially are, for example, anti-misting additives, or silicone mixtures including anti-misting additives, for thermally curing silicone release coatings. Thermally curing silicone release coatings are generally mixtures comprising hydrosiloxanes and vinylsiloxanes, which by the transition metal-catalyzed hydrosilylation are crosslinked and thereby cured. The anti-misting additives used for these systems are typically characterized in that they comprise particularly high molecular mass siloxanes which through residual functionalities, are able to be incorporated by curing as well.

The preparation and use of anti-misting additives for thermosetting silicone release coatings are described for example in EP 1481018 and EP 1277786 and also in U.S. Pat. No. 6,956,096. These prior art anti-misting additives comprise branched siloxane polymers obtained by linking alkenyl groups with SiH groups.

U.S. Pat. No. 6,774,201 presents star-branched siloxane polymers which are obtained by hydrosilylation.

All of the anti-misting additives described above have in common that they have been developed for specifically thermally curing silicone release coatings. The prior art anti-misting additives however are not in tune with the particular requirements of UV-curing silicone release coatings in relation, for example, to anti-misting effect, release force, adhesion and crosslinking, force of subsequent adhesion, and ageing.

SUMMARY OF THE INVENTION

The present invention provides an additive for radiation-curing release coating compositions that, when added even in small amounts, significantly reduces the tendency of such compositions to form mist in the coating of sheet substrates using applicator units. In one embodiment, the additives provided in the present disclosure are particularly suitable for radiation-curing silicones. The formation of spray mists is reduced by at least 15%, preferably by at least 30% and more preferably by at least 50% (in comparison to coatings without the inventive additive); the additive, therefore, is active in anti-misting. The properties of the radiation-curing silicone release coatings in terms of release force (Finat test methods, FTM 10) and of short-term forces of subsequent adhesion (Finat test methods, FTM 11) are influenced minimally or not at all by the inventive additive.

In one aspect of the present invention, an additive for radiation-curing release coating compositions is provided that includes a copolymer of formula (1)

$$[A']_a \cdot [B']_b \cdot [C']_c \cdot [D']_d, \qquad (1)$$

where
A'=structural unit of formula (2)

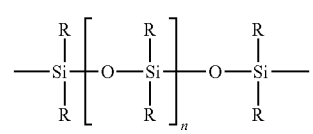

(2)

with n=2 to 498,
B'=structural unit of formula (3)

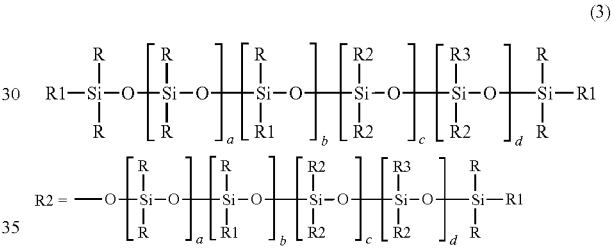

(3)

C'=identical or different structural units of formulae (4) and/or (5)

$$-CH_2-CH_2-Q1-CH_2-CH_2- \qquad (4)$$

$$-O-Q2-O- \qquad (5)$$

D'=identical or different structural units of formulae (6) and/or (7)

$$-CH_2-CH_2-Q1-CH=CH_2 \qquad (6)$$

$$-O-Q2-OH \quad (7)$$

in which
    a independently at each occurrence is 0 to 500,
    b independently at each occurrence is 0 to 60,
    c independently at each occurrence is 0 to 10,
    d independently at each occurrence is 0 to 10, with the proviso that c+d is greater than/equal to 1,
    R independently at each occurrence is a radical from the group of linear, cyclic or branched, aliphatic or aromatic, saturated or unsaturated hydrocarbon radicals having from 1 up to 20 C atoms,
    R1 independently at each occurrence is a bond to a structural unit or R,
    R3 independently at each occurrence is R1 or a heteroatom-substituted, functional, organic, saturated or unsaturated radical,
    with the proviso that at least one R1 is a bond to a structural unit and that the average number of T and Q units per structural unit B' is in each case not greater than 20 and the average number of D units per structural unit B' is not greater than 2000, a', b', c' and d' are indices which indicate the molar fractions of the structural units A' to D' in the compound of formula (1), and a' is from 20% to 70%, preferably 30% to 60% and more preferably 35% to 50%, b' is greater than 0% to 20%, preferably 0.1% to 15%, more preferably 0.1-10%, c'=30% to <60%, preferably 30% to 50%, and d' is greater than/equal to 0%, preferably >0% to 20%, more preferably from 1% to 15%, Q1=a bond or an organic radical and Q2=an organic radical.

In another aspect of the invention, a method of forming the aforementioned copolymer is provided that includes reacting components A, B and C, where component A is a compound of formula (10)

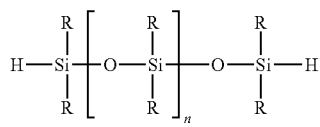
(10)

and n and R are as defined above, component B is a compound of formula (11)

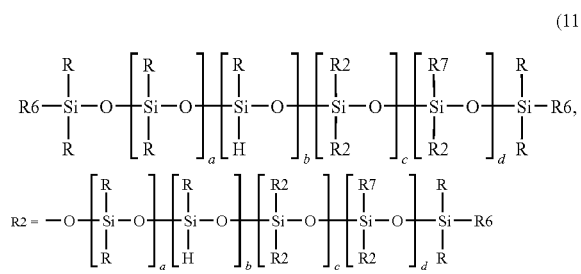
(11)

where
R6 independently at each occurrence is hydrogen or R,

R7 independently at each occurrence is hydrogen, R or a heteroatom-substituted, functional, organic, saturated or unsaturated radical, R, a, b, c and d are as defined above, with the proviso that if b=0 then at least one radical R6 or R7=H and that the average number of T and Q units per molecule is in each case not greater than 20, the average number of D units per molecule is not greater than 2000 and the average number of $D^H$ units per molecule is not greater than 100, and where component C is a compound of formula (12) and/or (13)

$$CH_2{=}CH\text{-}Q1\text{-}CH{=}CH_2 \quad (12)$$

$$H{-}O\text{-}Q2\text{-}O{-}H \quad (13)$$

where Q1 and Q2 have the definitions as described above.

The copolymers of the invention have the advantage that when they are used as additives in silicone release coatings the formation of spray mists is measurably reduced and at the same time there is virtually no effect on the release force or the short-term forces of subsequent adhesion. In one embodiment, the copolymers of the invention and the compositions of the invention have the advantage in that they can be used in UV-curing silicone release coatings, where they develop their advantages.

BRIEF DESCRIPTION OF THE DRAWINGS

FIG. 1, the sole drawing of the present application, is a graph of misting (%) vs. belt speed (m/min).

DETAILED DESCRIPTION OF THE INVENTION

The copolymers of the invention, a process for preparing them, compositions comprising these copolymers, and the use of the inventive copolymers are described exemplarily below, without any intention that the invention should be confined to these exemplary embodiments. Reference below to ranges, general formulae or classes of compound should be taken to encompass not only the corresponding ranges or groups of compounds that are explicitly referred to, but also all sub-ranges and sub-groups of compounds which may be obtained by extraction of individual values (ranges) or compounds. Where documents are cited as part of the present description, their content should be taken as belonging in its entirety to the disclosure content of the present invention.

The different monomer units of the compounds specified in the formulae (siloxane chains or polyoxyalkylene chains or hydrocarbons interrupted by heteroatoms) may have a blockwise construction with one another or be subject to a statistical distribution. The indices used in the formulae are to be considered as statistical average values. The average degree of branching k is understood in the context of the present invention to be the ratio of the number of M and MH units to T and Q units (M+MH)/(T+Q). The designation of the units is in accordance with the internationally recognized nomenclature, as may be consulted, for example, in sources including Thieme Römpp Online, Georg Thieme Verlag, 2008. According to that nomenclature, $M=R_3SiO_{1/2}$, $D=R_2SiO_{2/2}$, $T=RSiO_{3/2}$, and $Q=SiO_{4/2}$, where R are organic radicals. MH designates a unit in which one of the radicals R is a hydrogen atom. DH designates a unit in which one of the radicals R is a hydrogen atom. The degree of branching is determined by relativizing the area integrals of the peaks in a $^{29}$Si—NMR spectrum that are assigned to the respective units.

The copolymers of the invention are those of formula (1)

$$[A']_{a'}[B']_{b'}[C']_{c'}[D']_{d'}, \quad (1)$$

where

A'=structural unit of formula (2)

(2)

with n=2 to 498, preferably 18 to 148 and more preferably from 18 to 98,

B'=structural unit of formula (3)

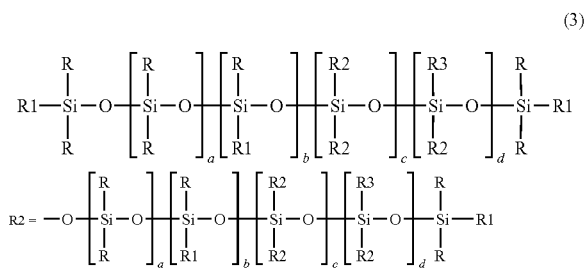
(3)

C'=identical or different structural units of formulae (4) and/or (5)

—CH$_2$—CH$_2$-Q1-CH$_2$—CH$_2$—  (4)

—O-Q2-O—  (5)

D'identical or different structural units of formulae (6) and/or (7)

—CH$_2$—CH$_2$-Q1-CH=CH$_2$  (6)

—O-Q2-OH  (7)

in which
  a independently at each occurrence is 0 to 500, preferably 1 to 300, more preferably 10 to 200,
  b independently at each occurrence is 0 to 60, preferably 0 to 30, more preferably >0, more particularly 1 to 15,
  independently at each occurrence is 0 to 10, preferably 0 or >0 to 5,
  d independently at each occurrence is 0 to 10, preferably 0 or >0 to 5, with the proviso that c+d is greater than/equal to 1, where preferably either c is greater than/equal to 1 and d=0 or d is greater than/equal to 1 and c=0,
  R independently at each occurrence is a radical from the group of linear, cyclic or branched, aliphatic or aromatic, saturated or unsaturated hydrocarbon radicals having from 1 up to 20 C atoms, that is preferably a methyl radical,
  R1 independently at each occurrence is a bond to a structural unit or R,
  R3 independently at each occurrence is R1 or a heteroatom-substituted, functional, organic, saturated or unsaturated radical, preferably selected from the group of alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radicals, more preferably a methyl, chloropropyl, vinyl or a methacryloyloxypropyl radical,
  Q1 independently at each occurrence is a bond or an organic radical and
  Q2 is an organic radical and
  a', b', c' and d' are indices which indicate the molar fractions of the structural units A' to D' in the compound of the formula (1), and a' is from 20% to less than 70%, preferably 30% to 60% and more preferably 35% to 50%, b' is greater than 0% to 20%, preferably 0.1% to 15%, more preferably 0.1% to 10%, c'=30% to less than 60%, preferably 30% to 50%, and d' is greater than/equal to 0%, preferably >0% to 20%, more preferably from 1% to 15%,
with the proviso that at least one R1 is a bond to a structural unit and that the average number of T and Q units per structural unit B' is in each case not greater than 20, preferably not greater than 10, more preferably not greater than 5, the average number of D units per structural unit is not greater than 2000, preferably not greater than 1000 and more preferably not greater than 500. The values of a, b, c and d may also be different in these radicals R2 when there are a plurality of radicals R2 in a structural unit B'.

Particularly preferred copolymers of the invention are those of formula (1a)

$[A'_aC'_{k'}][B'_bC'_{k''}][D'_{d'}]$  (1a)

with k'+k''=e', and where A', B', C' and D' and also a', b', c' and d' have the definitions specified for formula (1), and the ratio of the blocks $[A'_aC'_{k'}]$ and $[B'_bC'_{k''}]$ and also of the structural unit $[D'_{d'}]$ to one another is described by $X_x Y_y Z_z$, in which $X_x=[A'_aC'_{k'}]$, $Y_y=[B'_bC'_{k''}]$ and $Z_z=[D'_{d'}]$ and the indices x, y and z describe the ratio of X to Y to Z, and x=0.2 to <0.7, preferably 0.3 to 0.6, more preferably 0.35 to 0.5, y=greater than 0 to 0.2, preferably 0.001 to 0.15, more preferably 0.001 to 0.1, and z=greater than/equal to 0, preferably >0 to 0.2, more preferably from 0.01 to 0.15.

The blocks $[A'_aC'_{k'}]$ and $[B'_bC'_{k''}]$ may be present blockwise or in statistical distribution in the copolymer of the invention.

In the copolymers of the invention, the individual structural units are joined to one another by SiC bonds (bonds between structural units of formula (2) and/or (3) with (4) and (6)) and optionally by SiOC bonds (bonds between structural units of the formulae (2) and/or (3) with (5) and (7)).

A person skilled in the art is aware that Q units are siloxy groups without organic radicals, T units comprise siloxy groups with an organic radical selected from R1 and R3, and D units comprise two organic radicals selected from R1 and R3.

In one embodiment of the invention, it can be advantageous if at least one structural unit of the formula C' is a structural unit of formula (4) where Q1 is a bond or an organic radical selected from linear, cyclic or branched, aliphatic or aromatic hydrocarbon radicals having 1 to 30 carbon atoms, ester radicals composed of a dicarboxylic acid having 2 to 20 carbon atoms and an alkenol having 3 to 18 carbon atoms, ester radicals composed of a diol which comprises linear, cyclic or branched, aliphatic or aromatic hydrocarbon radicals having 2 to 30 carbon atoms and a carboxylic acid which carries 1 to 21 carbon atoms, preferably 7 to 9 carbon atoms, polyether radicals which optionally contain further heteroatoms such as N, the heteroatoms being present preferably at the end of the polyether chain, and the heteroatoms optionally having radicals from the group of linear, cyclic or branched, aliphatic or aromatic hydrocarbon radicals having from 1 up to 20 carbon atoms, radicals carrying polyether groups and amide groups, of formula (8a)

—(CH$_2$)$_e$—CON(R5)—CH(R4)CH$_2$—[O—CH(R4)CH$_2$]$_f$—O-[GO]$_g$—[CH$_2$CH(R4)O]$_h$—(R5)
NOC—(CH$_2$)$_j$—  (8a)

where
  R4 independently at each occurrence is H, —CH$_3$ or —C$_2$H$_5$, preferably H or —CH$_3$, R5 is the same as for R4,
  e and i independently of one another are 0 to 20, preferably 6 to 8,
  f and h independently of one another are values >1,
  g is 0 or 1,
  G is an unbranched or branched hydrocarbon radical having 2 to 10 C atoms,
  the total molar weight of the radical of the formula (8a) being from 100 to 10 000 g/mol, preferably 100 to 5000 g/mol, more particularly 400 to 3000 g/mol, so-called polyether-ester radicals, containing polyether groups and ester groups, of formula (8b)

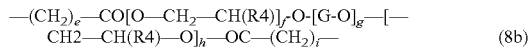
(8b)

where definitions of the abbreviations and indices correspond to those for formula (8a), the polyoxyalkylene radicals having a molar weight of 100 to 10 000 g/mol, preferably 100 to 5000 g/mol, more particularly 400 to 3000 g/mol.

In the copolymer of the invention preferably at least one structural unit of formula C' is a structural unit of formula (5) where Q2 is an organic radical selected from hydrocarbon radicals having 2 to 20 carbon atoms, which may optionally be substituted by (preferably 1 to 4) hydroxyl groups, or is a structural unit of formula (9)

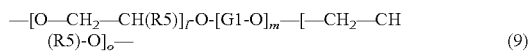
(9)

where R5 independently at each occurrence is H, —$CH_3$ or —$C_2H_5$, preferably H or —$CH_3$, l and o independently of one another are values greater than or equal to 0, m is at least 1 and G1 is a hydrocarbon radical having 2 to 10 C atoms, the total molar weight of the unit of formula (9) being preferably from 100 to 10 000 g/mol, more preferably from 100 to 5000 g/mol and with particular preference from 400 to 3000 g/mol.

In one embodiment, it can be advantageous if the copolymers of the invention have exclusively structural units of formula (4) as structural units of the formula C'. In this way only one catalyst is needed, since exclusively SiC linkages are produced. Since exclusively SiC linkages are present, copolymers of this kind exhibit a greater stability towards hydrolysis.

In another embodiment, it can be advantageous if at least one structural unit of formula D' is a structural unit of formula (6) where Q1 is a bond or an organic radical selected from linear, cyclic or branched, aliphatic or aromatic hydrocarbon radicals having 1 to 30 carbon atoms, ester radicals composed of a dicarboxylic acid having 2 to 20 carbon atoms and an alkenol having 3 to 18 carbon atoms, ester radicals composed of a diol which comprises linear, cyclic or branched, aliphatic or aromatic hydrocarbon radicals having 2 to 30 carbon atoms and a carboxylic acid which carries 1 to 21 carbon atoms, preferably 7 to 9 carbon atoms, polyether radicals, which optionally comprise further heteroatoms such as N, the heteroatoms being present preferably at the end of the polyether chain, and the heteroatoms optionally having radicals from the group of linear, cyclic or branched, aliphatic or aromatic hydrocarbon radicals having from 1 up to 20 carbon atoms, radicals which carry polyether groups and amide groups, of the above-indicated formula (8a), and so-called polyether-ester radicals, containing polyether groups and ester groups, of the above-indicated formula (8b).

Preferably in the copolymers of the invention at least one structural unit of formula D' is a structural unit of formula (7) where Q2 is an organic radical selected from hydrocarbon radicals having 2 to 20 carbon atoms, which may be substituted optionally by hydroxyl groups, preferably by 1 to 4 hydroxyl groups, or is a structural unit of formula (9a)

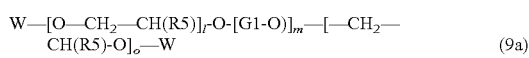
(9a)

where W=hydrogen atom or a bond, with one W being a bond and one W being a hydrogen atom, and the other indices and abbreviations correspond to those in formula (9).

In yet another embodiment of the invention, it can be advantageous if the copolymers of the invention have exclusively structural units of formula (6) as structural units of formula D'. In this way only one catalyst is needed, since exclusively SiC linkages are produced. Since exclusively SiC linkages are present, copolymers of this kind exhibit a greater stability towards hydrolysis.

Particularly preferred copolymers of the invention are those which, when they have exclusively structural units of formula (4) as structural units C', also exclusively have structural units of formula (6) as structural units of formula D'.

The copolymers of the invention can be obtained, for example, with the process of the invention, described below, for the preparation of copolymers, in which components A, B and C are reacted, wherein component A is a compound of formula (10)

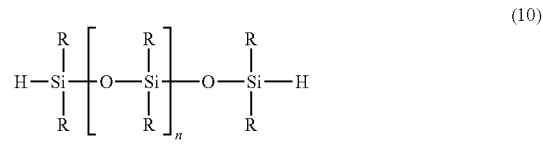
(10)

and n and R have the definition as specified above, component B is a compound of formula (11)

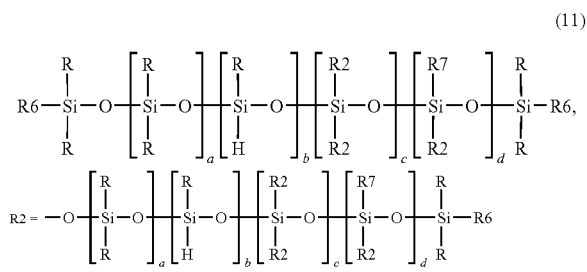
(11)

where

R6 independently at each occurrence is hydrogen or R,

R7 independently at each occurrence is hydrogen, R or a heteroatom-substituted, functional, organic, saturated or unsaturated radical, preferably selected from the group of alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radicals, more preferably a methyl, chloropropyl, vinyl or a methacryloyloxypropyl radical, R, a, b, c and d have the definition as specified above, with the proviso that if b=0 then at least one radical R6 or R7=H and that the average number of T and Q units per molecule is in each case not greater than 20, preferably not greater than 10, more preferably not greater than 5, the average number of D units per molecule is not greater than 2000, preferably not greater than 1000 and more preferably not greater than 500, and the average number of $D^H$ units per molecule is not greater than 100, preferably not greater than 60, and b is preferably greater than/equal to, more particularly equal to 0, and where component C is a compound of formula (12) and/or (13)

(12)

(13)

where Q1 and Q2 have the definitions as mentioned above.

Components of formula (13) that are preferably used in the invention are those of the abovementioned formula (9a), with the proviso that both radicals W are a hydrogen atom.

The branched modified hydrosiloxanes (component B) may be a siloxane in which the SiH functions are siloxanes in which the arrangement of the SiH functions is purely terminal, purely pendant or a mixture of terminal and pendant.

A person skilled in the art is well aware that Q units are siloxy groups without organic radicals, T units comprise siloxy groups with one organic radical, and D units comprise two organic radicals.

As compounds of component B it is possible to use all compounds which satisfy the formula for component B. In one embodiment, it is preferred to use as component B compounds of the kind described in DE 102007055485 and DE 102008041601, for example. Reference is made expressly to the preparation of the branched hydrosiloxanes that is described therein.

In the process of the invention, component A is used preferably in molar fractions of 20% to less than 70%, more preferably of 30% to 60%, very preferably 35% to 50%, component B preferably in molar fractions of greater than 0% to 20%, more preferably of 0.1% to 10%, very preferably of 0.1% to 5%, and component C preferably in molar fractions of 30% to 80%, more preferably of 30% to 70%, very preferably of 40% to 70%, the molar fractions of components A, B and C adding up to 100%.

In one preferred embodiment of the process of the invention exclusively compounds of formula (12) are used as component C.

In another preferred embodiment, compounds of formula (12) and compounds of formula (13) are used as component C, the molar ratio of the compounds of formula (12) to compounds of formula (13) being preferably from 1:0.5 to 1:3, more preferably from 1:1 to 1:3, very preferably 1:1 to 1:2.

As compounds of formula (12) it is possible to use all unsaturated organic compounds having at least two terminal C—C double bonds. These compounds may comprise, for example, heteroatoms such as N, S, O, P, aromatic constituents, carboxylic ester groups or carboxamide groups. Preferred compounds of formula (12) may be more particularly as follows:
1) linear, cyclic or branched, aliphatic or aromatic hydrocarbons having 4-30 carbon atoms and containing at least two terminal C—C double bonds,
2) esters composed of a dicarboxylic acid having 2-20 carbon atoms and of an alkenol having 5 to 20 carbon atoms, which contain at least two terminal C—C double bonds,
3) diesters composed of a dial which comprises linear, cyclic or branched, aliphatic or aromatic hydrocarbons having 2-30 carbon atoms and of two carboxylic acids, which may be identical or different, it being necessary for the carboxylic acids to have a terminal C—C double bond, and each acid has 3 to 23 carbon atoms, preferably 9 to 11 carbon atoms,
4) polyethers which comprise further heteroatoms such as N, the heteroatoms being located preferably at the end of the polyether chain, and the heteroatom having radicals from the group of linear, cyclic or branched, aliphatic or aromatic hydrocarbon radicals having from 1 up to 20 carbon atoms, and which have at least two terminal C—C double bonds,
5) compounds carrying polyether groups and amide groups, so-called polyetheramides, of formula (14a)

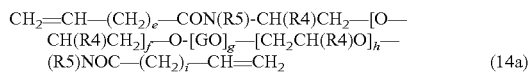

(14a)

where the indices and abbreviations have the definition specified above for formula (8a), and based on polyethers, which preferably have a molar weight of 100 to 10 000 g/mol, more preferably 100 to 5000 g/mol, more particularly 400 to 3000 g/mol; or
6) so-called polyether-esters, containing polyether groups and ester groups, of formula (14b)

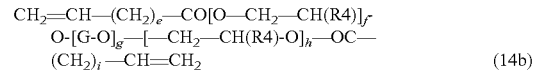

(14b)

where the definitions given above for (14a) apply, these polyether-esters being based on polyether compounds, which preferably have a molar weight of 100 to 5000 g/mol and whose terminal primary or secondary OH groups have been esterified with carboxylic acids which carry a C—C double bond, it being possible for the esterification to take place chemically or enzymatically.

Compounds of formula (14a) are obtainable for example by reaction of the terminal primary or secondary amine groups of amines which have at least two amine groups to form the carboxamide; it being necessary to use carboxylic acids which have a terminal C—C double bond.

The polyether-esters of formula (14h) that can used may be prepared preferably, as described in DE-10 2006 005 100.9, by condensation of the corresponding alcohols and acids with the use of at least one enzyme as catalyst. Instead of the acids it is also possible to use the corresponding esters of the carboxylic acids with volatile alcohols for an esterification: methyl, ethyl or vinyl esters are suitable examples.

The enzymes which can be used as catalysts for the esterification/transesterification are preferably those from the group of the hydrolytic enzymes, examples being lipases, esterases or proteases, such as, for example, cholesterol esterase, esterase from porcine liver or lipases from *Candida rugosa, Pseudomonas* sp., *Thermomyces langosiosus*, porcine pancreas, *Mucor miehei, Alcaligines* sp., preferably lipases, more preferably lipase B from *Candida antarctica*. As a catalyst, it is preferred to use the lipase B enzyme from *Candida antarctica* which is available under the product name Novozym® 435 from Novozymes Deutschland GmbH.

Silicone polyether copolymers linked via carboxylic ester groups are compounds which are known per se and may be obtained by a variety of methods.

For instance, patent applications JP-A-08-157601 and US-A-2003-0096919 describe the use of terminally unsaturated esters, but provide no details about the preparation and possible purification of these compounds. Taking account of the fact that the platinum metal-catalysed hydrosilylation is a reaction which is very sensitive to catalyst poisons, purification steps—in some cases extensive—are needed in order to obtain usable esters which can be readily further reacted with siloxanes.

As compounds of formula (13) it is possible to use all compounds having at least two hydroxyl groups, such as diols, triols or polyols, for example. As compound of formula (13) it is preferred to use the compounds listed below:
7) terminal diols having 2 to 20 carbon atoms,
8) triols having 2 to 20 carbon atoms,
9) polyols having 4 to 6 hydroxyl groups and 4 to 8, preferably 4 to 6, carbon atoms,
10) polyoxyalkylene compounds which can be described by formula (15)

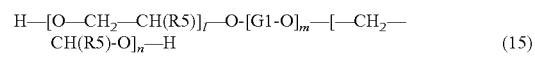

(15)

where
R5 independently at each occurrence is H, —CH$_3$ or —C$_2$H$_5$, preferably H or —CH$_3$,
n and 1 independently of one another are values greater than/equal to 0, preferably greater than/equal to 1,
m is at least 1,
G1 is a hydrocarbon radical having 2 to 10 C atoms,
the total molar weight of the compound of the formula (15) being from 100 to 10 000 g/mol, preferably from 100 to 5000 g/mol, more particularly 400 to 3000 g/mol.

The process of the invention is preferably carried out such that complete conversion of the SiH groups used is achieved. However, it can also be advantageous if the process is carried out such that conversion of the SiH groups, rather than being complete, is achieved to an extent of at least 95%, preferably 96% to 99%.

The reaction according to the invention may take place optionally with or without the use of a suitable solvent or suspension medium. Where the aim is for copolymers of high molecular mass and hence high viscosity, it can be advantageous, for the purpose of improving the handling properties, to perform the reaction in a suitable solvent or suspension medium. Examples of suitable solvents are alkanes, cycloalkanes, alkylaromatics and the like, preference being given more particularly to high-boiling solvents having boiling points >90° C., preferably >90° C. to <120° C.

In the process of the invention the reaction of compounds A and B with compounds of formula (10) is preferably a hydrosilylation reaction. The hydrosilylation may be performed as described in the prior art using noble metal catalysts, preferably platinum catalysts, more preferably the ethylene-activated Karstedt catalysts known from EP-A-1 520 870. The noble metal catalysts are used preferably in amounts (of the noble metal) of about $1 \times 10^{-4}$% to about $1 \times 10^{-2}$%, preferably $3 \times 10^{-4}$% to $5 \times 10^{-3}$%, by weight, based on the total amount. The hydrosilylation may be performed in the presence of a solvent or solventlessly.

One suitable hydrosilylation process is described exemplarily below. The reactants, i.e., compounds of formula (12), are introduced initially, optionally with inclusion of a solvent or suspension medium, with intimate mixing, at a preferably elevated temperature. Then a sufficient amount of a noble metal catalyst which is customary in the art for this reaction, preferably selected from the group of platinum catalysts, is added, and component A, or components A and. B, is or are metered in.

Where terminal hydrosiloxanes A and polyether-esters of formula (12) are reacted in the hydrosilylation, the products are linear SiC-linked prepolymers. Where terminal hydrosiloxanes A, branched terminal hydrosiloxanes or branched pendant hydrosiloxanes, or branched terminal and pendant hydrosiloxanes B and polyether-esters of formula (12) are used in the hydrosilylation, the products are branched SiC-linked prepolymers.

In the reaction the molar fraction of the SiH groups of component B as a proportion of the total amount of substance of all the SiH groups used is preferably less than 50%, more preferably less than 45%, very preferably less than 35% and more particularly less than 30%, since otherwise there is a risk of gelling.

Noble metal catalysts which can be used in the hydrosilylation are preferably Karstedt catalysts. The noble metal catalysts are used preferably in amounts of about $1 \times 10^{-4}$% to about $1 \times 10^{-2}$% by weight, preferably $3 \times 10^{-4}$% to $5 \times 10^{-3}$%, by weight, based on the total amount.

The reaction temperature for the hydrosilylation is preferably from 60° C. to 140° C., more preferably from 70° C. to 120° C.

Where only components that react by hydrosilylation are used in the process of the invention, it can be advantageous to carry out the hydrosilylation in two steps. Thus, for example, first a hydrosilylation with component A and compounds of formula (12) can be carried out, the compounds of formula (12) being used either preferably in a molar deficit or preferably in a molar excess, and in a second hydrosilylation step component B and any further compounds of formula (12) are added and reacted, the reaction being such that all in all there is a slight excess of the compounds of formula (12) present.

For this purpose, in the reaction according to the invention, in the first step the SiH functions of component A or of components A and B with the C=C double bonds of component C are used preferably with a molar ratio of the functional groups of SiH to C=C of 1:0.4 to 1:0.95, more preferably 1:0.5 to 1:0.9, very preferably 1:0.5 to 1:0.8.

In another preferred embodiment of the reaction according to the invention, in the first step the SiH functions of component A or of components A and B with the C=C double bonds of component C are used with a molar ratio of the functional groups of SiH to C=C of preferably 1:1.01 to 1:2, more preferably 1:1.05 to 1:1.5 and very preferably 1:1.1 to 1:1.3.

In a further hydrosilylation reaction components A or B, preferably component B, is or are added to the prepolymer in a suitable solvent or suspension medium at elevated temperature and with intimate mixing, the molar ratio of the functional groups SiH of component B to the functional groups C=C of the prepolymer being preferably from 1:1.05 to 1:30, more preferably from 1:2 to 1:15 and very preferably from 1:2 to 1:10.

Where the hydrosilylation reactions are carried out in succession it can be advantageous to carry out a step of working-up between the reaction steps.

In the process of the invention the reaction of components A and B with the compounds of formulae (12) and (13) preferably takes place by the implementation of a hydrosilylation and a dehydrogenative condensation. The dehydrogenative condensation can be carried out as described in the prior art. The two reactions can be carried out simultaneously or successively, preferably successively. Where the reactions are carried out successively, it is possible to carry out the hydrosilylation first and then the dehydrogenative condensation, or the other way round. Preferably, a hydrosilylation is carried out first and then a dehydrogenative condensation. More preferably, the process of the invention is carried out such that in the course of the reaction a hydrosilylation is carried out using a noble metal catalyst, preferably selected from the group of platinum catalysts, and a dehydrogenative coupling is carried out using at least one catalyst which preferably comprises at least one of the elements B, Al and Ga. Where the reactions are carried out successively it can be advantageous to carry out a working-up step between the reaction steps.

One embodiment of the dehydrogenative condensation is described exemplarily below. In the dehydrogenative condensation, SiH functions, which are present, for example, in the prepolymer formed through hydrosilylation of components A, B or A and B with compounds of formula (12), and also any SiH groups of additionally added components A and/or B, especially B, are reacted with the hydroxyl groups of the compounds of formula (13).

All of the reactants can in principle be introduced initially together with intimate mixing at elevated temperature and reacted by addition of a sufficient amount of a catalyst which is customary in the art for this reaction. In another preferred embodiment, the customary art catalyst is added at room temperature and the reactants are heated slowly with intimate mixing.

Examples of suitable catalysts for the dehydrogenative condensation are NaOH, KOH, tetramethylammonium hydroxide, alkali metal fluorides, alkaline earth metal fluorides, boron catalysts, such as tris(pentafluorophenyl)borane, carboxylic acids, triflates, such as scandium triflate, and/or carboxylates or mixtures thereof Preferred catalysts are those as described in DE 103 12 636 and U.S. Pat. No. 6,482,912, for example.

As catalysts, it is preferred to use element compounds of main group III and/or element compounds of transition group 3. Preferred catalysts are those containing boron and/or aluminium and/or those containing scandium, yttrium, lanthanum and/or lanthanoids.

Boron catalysts used are preferably $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(Ph)_2(C_6F_5)$; $[C_6H_4(mCF_3)]_3$ B; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_1)B(C_6F_5)_2$; $(C_8H_{14}B)(C_6F_5)$; $(C_6F_5)_2B(OC_2H_5)$; $(C_6F_5)_2B—CH_2CH_2Si(CH_3)_3$;

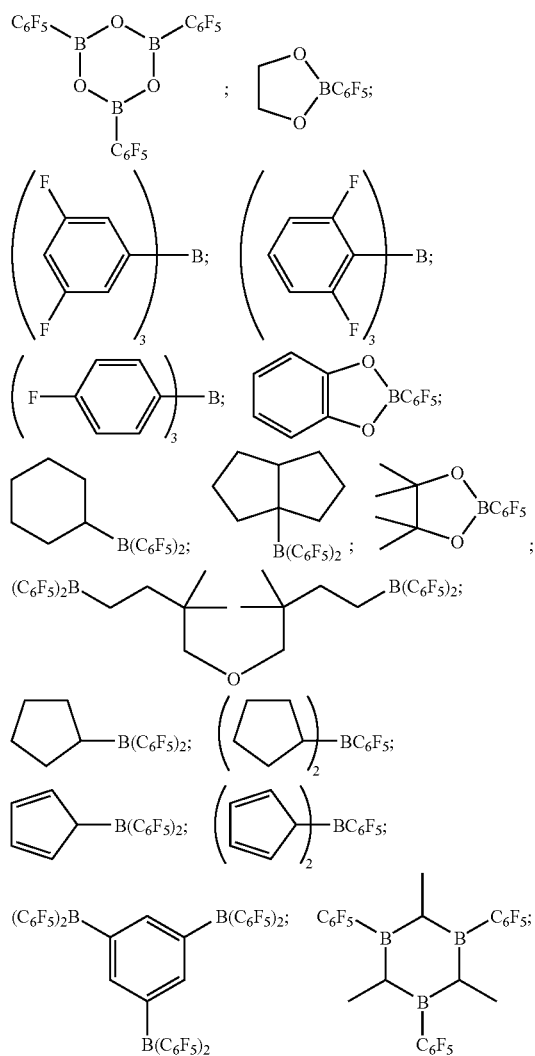

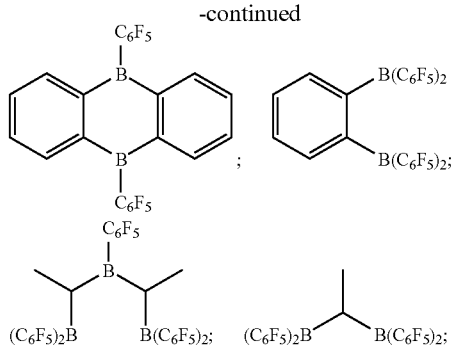

especially tris(perfluorotriphenylborane), boron trifluoride-etherate, borane-triphenylphosphine complex, triphenylborane, triethylborane and boron trichloride, tris(pentafluorophenyl)boroxine (9CI), 4,4,5,5-tetramethyl-2-(pentafluorophenyl)-1,3,2-dioxaborolane (9CI), 2-(pentafluorophenyl)-1,3,2-dioxaborolane (9CI), bis(pentafluorophenyl)cyclohexylborane, di-2,4-cyclopentadiene-1-yl(pentafluorophenyl)borane (9CI), (hexahydro-3a(1H)-pentalenyl)bis(pentafluoro-phenyl)borane (9CI), 1,3-[2-[bis(pentafluorophenyl)boryl]ethyl]tetramethyldisiloxane, 2,4,6-tris(pentafluorophenyl)borazine (7CI, 8CI, 9CI), 1,2-dihydro-2-(pentalluorophenyl)-1,2-azaborine (9CI), 2-(pentafluorophenyl)-1,3,2-benzodioxaborole (9CI), tris(4-trifluoromethoxyphenyl)borane, tris(3-trifluoromethylphenyl)borane, tris(4-fluorophenyl)-borane, tris(2,6-difluorophenyl)borane, tris(3,5-difluorophenyl)borane, methyliumtriphenyl tetrakis(pentafluorophenyl)borate, N,N-dimethylanilinium tetrakis(pentafluorophenyl)borate and mixtures thereof.

Preferred catalysts not containing boron are selected from the following: $AlCl_3$, aluminium acetylacetonate, $AlF_3$, aluminium trifluoromethanesulfonate, diisobutylaluminium chloride, diisobutylaluminium hydride, triethylaluminium, scandium(III) chloride, scandium(III) fluoride, scandium(III) hexafluoroacetylacetonate, scandium(III) trifluoromethanesulfonate, tris(cyclopentadienyl)scandium, tris(cyclopentadienyl)yttrium, yttrium(III) chloride, yttrium(III) fluoride, yttrium(III) hexafluoroacetylacetonate, yttrium(III) naphthenate, lanthanum(III) chloride, lanthanum(III) fluoride, lanthanum(III) lanthanum(III) trifluoromethanesulfonate, tris(cyclopentadienyl)lanthanum, cerium(III) bromide, cerium (III) chloride, cerium(III) fluoride, cerium(IV) fluoride, cerium(III) trifluoroacetylacetonate, tris(cyclopentadienyl) cerium, europium(III) fluoride, europium(II) chloride, praseodymium(III) hexafluoroacetylacetonate, praseodymium(III) fluoride, praseodymium(III) trifluoroacetylacetonate, samarium(III) chloride, samarium(III) fluoride, samarium(III) naphthenate, samarium(III) trifluoroacetylacetonate, ytterbium(III) fluoride, ytterbium(III) trifluoromethanesulfonate and tris(cyclopentadienyl)ytterbium, and mixtures thereof.

The dehydrogenative condensation as well may take place optionally with or without the use of a suitable solvent or suspension medium. If a solvent has been used in the hydrosilylation (in the first step), the prepolymer may be used in that same solution, or else prepolymer freed of the solvent or else prepolymer which has undergone solvent transfer may be used in the dehydrogenative condensation. Where the aim is for copolymers of high molecular mass and hence of high viscosity, it can be advantageous, for the purpose of improving the handling properties, to carry out the reaction in a suitable solvent. Examples of suitable solvents are alkanes, cycloalkanes, alkylaromatics, and the like, particular preference being given to high-boiling solvents or suspension media having boiling points >90° C., preferably from >90 to <120° C.

In the dehydrogenative condensation the components are used preferably in amounts such that the molar ratio of SiH functions present in the reaction mixture, which may originate in particular from the prepolymer and from the components A and B, preferably B, to hydroxyl groups, which originate in particular from the compounds of formula (13), is from 1:1 to 1:5, preferably from 1:1.05 to 1:3 and more preferably from 1:1.1 to 1:3.

The process of the invention is used preferably to prepare the copolymers of the invention.

A feature of the compositions of the invention is that in addition to the copolymers of the invention they also comprise compounds of the type of components A and/or B and/or C. Such a composition may be obtained by carrying out the reaction of the Si—H groups, as described above, not completely, or by using a molar excess of the respective component(s), or the copolymers of the invention are blended subsequently with compounds of components A and/or B and/or C. The mass ratio of copolymers of the invention to the sum of components A, B and C is preferably from 1:0.001 to 1:0.1, more preferably from 1:0.01 to 1:0.05.

The copolymers of the invention and the compositions of the invention can be used as additives in silicone release coatings, preferably in UV-curing silicone release coatings. Use as anti-misting additives is preferred. Silicone release coatings of the invention that are of this kind, preferably UV-curing silicone release coatings, preferably have from 0.001% to 5%, more preferably 0.01% to 2.5%, very preferably 0.1% to 1%, by weight, of copolymer of the invention or composition of the invention.

The copolymers of the invention are particularly suitable as anti-misting additives, especially for UV-crosslinkable silicone mixtures, for use in rapid coating systems with coating speeds of 200-2500 m/min, preferably 300-1000 m/min or greater 1000 to 2000 m/min, more preferably 1100 to 1600 m/min, where the silicone mixtures, including the anti-misting additives of the invention, are applied to the surfaces that are to be coated.

In one embodiment, one advantage of the invention is depicted in FIG. 1. Specifically, FIG. 1 shows a graph of the results of example 20. Values are shown for the misting as a function of belt speed for two different formulations. It is evident that the misting tendency is significantly reduced by addition of the additive of the invention.

In the examples which are set out below, the present invention is described exemplarily, without any intention that the invention, the scope of whose application is given by the description and the claims in their entirety, should be restricted to the embodiments in the examples.

EXAMPLES AND EXPERIMENTAL DETAILS

The average degree of branching k=(M+MH)/(T+Q) was determined by relativizing the respective area integrals of a 29Si—NMR spectrum.

GPC measurements were carried out with the following parameters: HP1100 instrument, column length: 65 cm, ID: 0.80 cm, temperature: 30° C., mobile phase: tetrahydrofuran, flow rate: 1.0 m/min, sample concentration: 10.00 g/l, detector: HP RI, calibrated against polystyrene 162-2 570 000 g/mol.

The SiH value was determined by gas volumetry, by performing the decomposition of an aliquot sample with sodium butoxide solution in a gas burette.

A process for the enzymatic esterification of carboxylic esters is described in DE102008004726.0.

The viscosities reported in examples 7, 8, 9, 13, 14, 15, 16 and 17 were measured on a Stress-Tech Rheometer rotational viscometer from Reologica at 25° C. in a cone/plate system with a 4° cone and a plate diameter of 40 mm. The viscosities reported in examples 2, 4 and 5 were measured on a Rheoplus MCS301 rotational viscometer from Anton Paar at 25° C. in a plate/plate system, the plate diameter being 50 mm and the plate spacing being 1 mm for example 5 and 2 mm for examples 2 and 4.

The linear terminal hydrosiloxanes used in the examples below can be prepared by the process described in EP 1439200. A process for preparing branched hydrosiloxanes with T units is described in DE102007055485.2, and a process for preparing branched hydrosiloxanes with Q units is described in DE102008041601.0.

The noble metal catalyst used in the examples below was a commercial Karstedt catalyst which was gassed with ethylene in accordance with EP 1520870.

Example 1

Not Inventive

A 500 ml four-necked flask with KPG stirrer, contact thermometer and reflux condenser was charged with 1.5 g of octadiene in 83.4 g of toluene and this initial charge was heated to 80° C. The mixture was admixed with 5 ppm by mass of Pt, based on the total batch, of a Karstedt catalyst, and a mixture of 22.2 g of a linear terminal hydrosiloxane having an SiH value of 0.86 eq/kg and 59.7 g of a linear terminal hydrosiloxane having an SiH value of 0.32 eq/kg was added dropwise over the course of an hour, followed by stirring at 80° C. for a further hour until the desired SiH conversion was obtained.

80.7 g of the toluenic solution of the prepolymer were admixed at room temperature with 0.43 g of octadiene, and the mixture was heated to 80° C. and stirred at 80° C. for two hours. The solvent was removed under reduced pressure to give a pale yellow, clear and fluid polymer. $M_w$=73 032, $M_n$=44 036

Example 2

Inventive

A 500 ml four-necked flask with KPG stirrer, contact thermometer and reflux condenser was charged with 14 g of bisundecylenic ester of a polyoxyalkylene compound (average molar weight around 2847 g/mol, propylene oxide fraction/ethylene oxide fraction=50:50) in 68 g of toluene, this initial charge was heated to 80° C., and 5 ppm by mass of Pt, based on the total batch, of a Karstedt catalyst were added. 54 g of a linear terminal hydrosiloxane having an SiH value of 0.32 eq/kg were added dropwise over the course of 30 minutes, and stirring was continued at 80° C. for a further 2.5 hours with monitoring of the SiH value. At room temperature, 2.3 g of a branched terminal hydrosiloxane with an average of five branches and with an SiH value of 1.039 eq/kg, 200 mg of glycol, 30 g of toluene and 3.0 mg of trispentafluorophenylborane were added with stirring to 57.8 g of the reaction mixture. The temperature was raised slowly to 60° C. and the reaction mixture was maintained at 60° C. until complete SiH conversion was ascertained. The solvent was removed under reduced pressure to give a clear polymeric reaction product having a dynamic viscosity of 670 000 mPas. The reaction product in the form of a 33% strength solution in TEGO® RC 711 (a product of Evonik Goldschmidt GmbH) was subjected to performance-related analysis. GPC: $M_w$=392 013, $M_n$=34 047

Example 3

Inventive

A 500 ml four-necked flask with KPG stirrer, contact thermometer and reflux condenser was charged with 12 g of bisundecylenic ester of a polyoxyalkylene compound (average molar weight around 2847 g/mol, propylene oxide fraction/ethylene oxide fraction 50:50) in 63 g of toluene, this initial charge was heated to 80° C., and 5 ppm by mass of Pt, based on the total batch, of a Karstedt catalyst were added. A mixture of 46 g of a linear terminal hydrosiloxane having an SiH value of 0.32 eq/kg and 4.6 g of a branched terminal hydrosiloxane having an average of 5 branches and an SiH value of 1.039 eq/kg were added dropwise over the course of 50 minutes.

At room temperature 0.31, g of glycol and 57 mg of trispentafluorophenylborane were added to 101 g of the reaction mixture. The mixture was heated slowly to 60° C. It underwent gelling within 30 minutes.

Example 4

Inventive

A 500 ml four-necked flask with KPG stirrer, contact thermometer and reflux condenser was charged with 29.8 g of bis-undecylenic ester of a polyoxyalkylene compound (average molar weight around 2847 g/mol, propylene oxide fraction/ethylene oxide fraction=48:52) in 108 g of toluene, this initial charge was heated to 80° C., and 5 ppm by mass of Pt, based on the total batch, of a Karstedt catalyst were added. A mixture of 22.2 g of a linear terminal hydrosiloxane having an SiH value of 0.86 eq/kg and 59.7 g of a linear terminal hydrosiloxane having an SiH value of 0.32 eq/kg was added dropwise over the course of an hour, and stirring was continued at 80° C. for 1.5 hours.

At room temperature, 3.65 g of a branched hydrosiloxane having an average of five branches and having an SiH value of 1.039 eq/kg and 0.29 g of glycol were added to 66.4 g of the reaction mixture, a total of 70 mg of trispentafluorophenylborane were added, and the mixture was heated slowly to 60° C. After a total of three hours, complete SiH conversion was reached. The solvent was removed under reduced pressure to give a polymer having a dynamic viscosity of 1 528 000 mPas as a product. The reaction product in the form of a 35% strength solution in TEGO® RC 711 was subjected to performance-related analysis.

Example 5

Inventive

A 500 ml four-necked flask with KPG stirrer, contact thermometer and reflux condenser was charged with 9.4 g of bis-undecylenic ester of a polyoxyalkylene compound (average molar weight around 1700 g/mol, propylene oxide fraction/ethylene oxide fraction 65:35) in 63 g of toluene and this initial charge was heated to 80° C., and 5 ppm by mass of Pt, based on the total batch, of a Karstedt catalyst were added. 54 g of a linear terminal hydrosiloxane having an SiH value of 0.32 eq/kg were added dropwise over the course of 1.5 hours, and stirring was continued at 80° C. for a further 30 minutes.

At room temperature, 3.0 g of branched terminal hydrosiloxane having an average of 5 branches and having an SiH value of 1.039 eq/kg, 0.25 g of glycol and 39 mg (500 ppm) of trispentafluorophenylborane were added to 70.1 g of the reaction mixture. The mixture was heated slowly to 60° C. and, after an hour, full SiH conversion was achieved. The solvent was removed under reduced pressure to give a clear polymer having a dynamic viscosity of 31 200 mPas. GPC: $M_w$=38 475; $M_n$=13 044

Example 6

Inventive

A 500 ml four-necked flask with KPG stirrer, contact thermometer and reflux condenser was charged with 10.4 g of a polyoxyalkylene compound (average molar weight around 2847 g/mol, propylene oxide fraction/ethylene oxide fraction=50:50) in 56.4 g of toluene, this initial charge was heated to 80° C., and 56 mg of trispentafluorophenylborane were added. Then 46 g of a linear terminal hydrosiloxane (SiH value=0.32 eq/kg) were added dropwise, with evolution of hydrogen. Complete conversion of the SiH functions was observed. A toluenic solution of a prepolymer was obtained.

2.0 g of a branched terminal hydrosiloxane having an average of five branches and having an SiH value of 1.039 eq/kg and 0.18 g of glycol were added to 50 g of the toluenic solution of the prepolymer, and the mixture was stirred at 75° C. for a further three hours. The solvent was removed under reduced pressure to give a fluid polymer. The polymer was diluted to give a 35% strength solution (% by weight) in TEGO® RC 711, which was subjected to performance-related analysis. GPC: $M_w$=38 475; $M_n$=13 044

Example 7

Inventive 5.0 g of a branched terminal hydrosiloxane having an average of 5 branches and having an SiH value of 1.039 eq/kg and 5.2 g of PEG 400 and also 0.36 g of glycol were added to 56.6 g of the toluenic solution of a prepolymer from example 6, and the mixture was heated at 60° C. for three hours. The solvent was removed under reduced pressure to give a clear polymer having a dynamic viscosity of 123 200 mPas. GPC: $M_w$=237 644; $M_n$=2014

Example 8

Inventive

A 2000 ml four-necked flask with KPG stirrer, contact thermometer and reflux condenser was charged with 111.3 g of bis-undecylenic ester of a polyoxyalkylene compound (average molar weight around 1700 g/mol, propylene oxide fraction/ethylene oxide fraction=65:35) in 545.5 g of toluene, this initial charge was heated to 80° C., and 5 ppm by mass of Pt, based on the total batch, of a Karstedt catalyst were added. A mixture of 117.7 g of a terminal hydrosiloxane having an SiH value of 0.86 eq/kg and 316.4 g of a linear terminal hydrosiloxane having an SiH value of 0.32 eq/kg was added dropwise over the course of two hours.

At room temperature 915 g of the toluenic solution of the prepolymer with 32.7 g of a branched hydrosiloxane having an average of 5 branches and having an SiH value of 1.123 eq/kg, 3.9 g of ethylene glycol and 500 ppm by mass (470 mg) of trispentafluorophenylborane were added and the mixture was heated slowly to 50° C. Within an hour, complete SiH conversion was ascertained. The solvent was removed under reduced pressure to give a clear, yellowish polymer having a dynamic viscosity of 69 700 mPas. GPC: $M_w$=60 940, $M_n$=8292

Example 9

Inventive

A 2000 ml four-necked flask with KPG stirrer, contact thermometer and reflux condenser was charged with 94 g of bis-undecylenic ester of a polyoxyalkylene compound (average molar weight around 1700 g/mol, propylene oxide fraction/ethylene oxide fraction=65:35) in 653 g of toluene, this initial charge was heated to 80° C., and 2 ppm by mass of Pt, based on the total batch, of a Karstedt catalyst were added. 540 g of a linear terminal hydrosiloxane having an SiH value of 0.32 eq/kg were added dropwise over the course of two hours. This gave a toluenic solution of a prepolymer.

At room temperature 1205 g of the toluenic solution of the prepolymer with 31.3 g of a branched hydrosiloxane having an average of 5 branches and having an SiH value of 1.123 eq/kg, 3.8 g of ethylene glycol and 500 ppm by mass of trispentafluorophenylborane were added and the mixture was heated slowly to 50° C. Within three hours, complete SiH conversion was ascertained. The solvent was removed under reduced pressure to give a clear, yellowish polymer having a dynamic viscosity of 30 600 mPas. GPC: $M_w$=74 529, $M_n$=16 627

Example 10

Inventive

A 500 ml four-necked flask with KPG stirrer, contact thermometer and reflux condenser was charged with 9.4 g of bis-undecylenic ester of a polyoxyalkylene compound (average molar weight around 1700 g/mol, propylene oxide fraction/ethylene oxide fraction 65:35) in 63 g of toluene, this initial charge was heated to 80° C., and 5 ppm by mass of Pt, based on the total batch, of a Karstedt catalyst were added. 54 g of a linear terminal hydrosiloxane having an SiH value of 0.32 eq/kg were added dropwise and the mixture was stirred at 80° C. for an hour.

At room temperature, 1.88 g of bis-undecylenic ester of a polyoxyalkylene compound (average molar weight around 1700 g/mol, propylene oxide fraction/ethylene oxide fraction=65:35) were added to 60.6 g of the toluenic solution of the precursor, and the mixture was heated to 80° C. and stirred at 80° C. for a further two hours. At room temperature, 59.5 g of the solution were admixed with 0.45 g of a branched hydrosiloxane having an average of 5 branches and having an SiH value of 1.123 eq/kg and with 0.16 g of octadiene, and stirring was continued for two hours more at 80° C. until SiH conversion was complete. The solvent was removed under reduced pressure to give a clear, fluid polymer. $M_w$=54 304, $M_n$=7176

Example 11

Inventive

A 500 ml four-necked flask with KPG stirrer, contact thermometer and reflux condenser was charged with 0.89 g of octadiene in 61 g of toluene, this initial charge was heated to 80° C., and 5 ppm by mass of Pt, based on the total batch, of a Karstedt catalyst were added. 59.7 g of a linear terminal hydrosiloxane having an SiH value of 0.32 eq/kg were added dropwise and the SiH value was monitored. At room temperature, a further 0.21 g of octadiene and 1.83 g of a branched terminal hydrosiloxane having an average of 5 branches and having an SiH value of 1.123 eq/kg were added to 51.6 g of the solution, and the system was maintained at 80° C. until SiH conversion was complete. One portion of the solution was mixed with TEGO® RC 902 and freed from the solvent under reduced pressure, to give a 10% strength solution (% by weight) that was subjected to performance-related analysis. A further portion was freed from the solvent under reduced pressure, to give a clear polymer. GPC: $M_w$=645 204, $M_n$=74 225

Example 12

Inventive

A 500 ml four-necked flask with KPG stirrer, contact thermometer and reflux condenser was charged with 1.5 g of octadiene in 83.4 g of toluene, this initial charge was heated to 80° C., and 5 ppm by mass of Pt, based on the total batch, of a Karstedt catalyst were added. 59.7 g of a linear terminal hydrosiloxane having an SiH value of 0.32 eq/kg and 22.2 g of a linear terminal hydrosiloxane having an SiH value of 0.86 eq/kg were added dropwise and the mixture was stirred at 80° C. for two hours. At room temperature, a further 0.33 g of octadiene and 1.27 g of a branched terminal hydrosiloxane having an average of 5 branches and having an SiH value of 1.123 eq/kg were added to 60.3 g of the reaction mixture, and the system was stirred at 80° C. until SiH conversion was complete. The solution was mixed with TEGO® RC 902 and freed from the solvent under reduced pressure, to give a 10% strength solution (% by weight) which was subjected to performance-related analysis. GPC: $M_w$=542 333, $M_n$=82 321

Example 13

Inventive

A 500 ml four-necked flask with KPG stirrer, contact thermometer and reflux condenser was charged with 7.4 g of bis-undecylenic ester of hexanediol in 119 g of toluene, this initial charge was heated to 80° C., and 3 ppm by mass of Pt, based on the total batch, of a Karstedt catalyst were added. 112 g of a linear terminal hydrosiloxane having an SiH value of 0.34 eq/kg were added dropwise, the mixture was stirred at 80° C. for 15 minutes more, and the SiH value was monitored. A toluenic solution of a prepolymer was obtained.

106.4 g of the toluenic solution were admixed at room temperature with 1.83 g of bis-undecylenic ester of hexanediol and 3.83 g of a branched terminal hydrosiloxane having an average of 5 branches and having an SiH value of 1.123 eq/kg, the mixture was heated to 80° C., and complete SIH conversion was obtained after 30 minutes. One portion of the solution was mixed with TEGO® RC 902 and freed from the solvent under reduced pressure, to give a 10% strength solution (% by weight), which was subjected to performance-related analysis. A further portion was freed from the solvent under reduced pressure, to give a clear polymer having a dynamic viscosity of 149 000 mPas. GPC: $M_w$=740 149, $M_n$=61 508

Example 14

Inventive 52.1 g of the toluenic solution of a prepolymer from example 13 were admixed with 0.22 g of octadiene and 1.88 g of a branched terminal hydrosiloxane having an average of 5 branches and an SiH value of 1.123 eq/kg, this mixture was heated to 80° C., and complete SiH conversion was obtained after an hour. One portion of the solution was mixed with TEGO® RC 902 and freed from the solvent under reduced pressure, to give a 10% strength solution (% by weight) which was subjected to performance-related analysis. A further portion was freed from the solvent under reduced pressure, to give a clear polymer having a dynamic viscosity of 62 200 mPas. GPC: $M_w$=208 682, $M_n$=57 392

Example 15

Inventive

A 500 ml four-necked flask with KPG stirrer, contact thermometer and reflux condenser was charged at room temperature with 69.5 g of the reaction mixture of the precursor from example 13 with 1.2 g of bis-undecylenic ester of hexanediol, and the mixture was stirred at 80° C. for an hour. Then, with stirring at 80° C., 1.7 g of a branched terminal hydrosiloxane having an average of 5 branches and having an SiH value of 1.123 eq/kg was added dropwise over the course of 10 minutes, and the mixture was stirred at 80° C. for a further hour until the SiH conversion was complete. One portion of the solution was mixed with TEGO® RC 902 and freed from the solvent under reduced pressure, to give a 10% strength solution (% by weight), which was subjected to performance-related analysis. A small portion of the reaction product was freed directly from the solvent under reduced pressure, to give a clear, fluid polymer having a dynamic viscosity of 40 500 mPas. GPC: $M_w$=196 304, $M_n$=40 574

Example 16

Inventive

A 1000 ml four-necked flask with KPG stirrer, contact thermometer and reflux condenser was charged at room temperature with 2.8 g of octadiene and 115 g of toluene, this initial charge was heated to 80° C., and 5 ppm by mass of Pt, based on the total batch, of a Karstedt catalyst were added. With stirring and at 80° C., 112 g of a linear terminal hydrosiloxane having an SiH value of 0.34 eq/kg were added dropwise over the course of 40 minutes, and the mixture was stirred at 80° C. for 40 minutes more until SiH conversion was complete.

63.3 g of the precursor were freed from the solvent under reduced pressure and redissolved in 30 g of toluene. 60.4 g of this solution were admixed at room temperature with 1.2 g of a branched terminal hydrosiloxane having an average of 5 branches and having an SiH value of 1.123 eq/kg, and the mixture was heated to 80° C. and stirred for a further hour until SiH conversion was complete. A portion of the solution was dissolved in TEGO® RC 902, the mixture was freed from the solvent under reduced pressure, and a 20% strength solution (% by weight) was obtained which was subjected to performance-related analysis.

A small portion was freed from the solvent directly under reduced pressure, to give a clear product having a dynamic viscosity of 62 000 mPas. GPC: $M_w$=493 423, $M_n$=22 267

Example 17

Inventive

A 1000 ml four-necked flask with KPG stirrer, contact thermometer and reflux condenser was charged at room temperature with 2.8 g of octadiene and 115 g of toluene, this initial charge was heated to 80° C., and 5 ppm by mass of Pt, based on the total batch, of a Karstedt catalyst were added. With stirring and at 80° C., 112 g of a terminal hydrosiloxane having an SiH value of 0.34 eq/kg were added dropwise over the course of 40 minutes, and stirring was continued at 80° C. for a further 45 minutes until the SiH conversion was complete. 76.9 g of the reaction mixture were subsequently admixed at 80° C. and with stirring with 3.0 g of a branched terminal hydrosiloxane having an average of 5 branches and having an SiH value of 1.123 eq/kg, this addition taking place dropwise over 1.5 hours. One portion of the solution was dissolved in TEGO RC 902 and the mixture was freed from the solvent under reduced pressure, to give a 10% strength solution (% by weight), which was subjected to performance-related analysis. A small portion was freed directly from the solvent under reduced pressure, to give a clear product having a dynamic viscosity of 92 000 mPas. GPC: $M_w$=524 057, $M_n$=47 002

Example 18

Comparison of Misting Tendency

In the example below, the suitability of the copolymers described in examples 1 to 17 as anti-misting additives for UV-crosslinkable silicone mixtures was tested.

The reduction in aerosol formation brought about by the additives of the invention was determined by means of a roller atomizer. The two rollers rotate at a speed of 1115 or 1571 m/min. Aerosol formation was determined using the Dusttrack Aerosol Monitor Model 8520 in accordance with the operating instructions. Sampling was carried out at a distance of 8 cm from the roller nip. The upper limit of the Dusttrack's measurement range is 150 ppm. The amount of formulation applied was 4 g of silicone mixture per measurement in each case. For one measurement the silicone was applied, the rollers were accelerated to the desired speed, and the values were recorded. The values for the formulation with additive, at its maximum, were relativized to the maximum value for the formulation without additive.

On the roller atomizer, the formulations specified in Table 1 were tested. As comparative substances, the formulations which had no additives were tested. The measurement values for the formulations without additive were defined as 100% misting.

TABLE 1

Composition of the standard formulations A and B in parts by mass

| Silicone | Standard formulation A | Standard formulation B |
|---|---|---|
| TEGO ® RC 902 | 70 | 50 |
| TEGO ® RC 922 | 0 | 20 |
| TEGO ® RC 711 | 30 | 30 |
| TEGO ® Photoinitiator A17 | 2 | 2 |
| Additive | 0.4 | 0.4 |

The results for the test of misting tendency are reported in Tables 2 and 3.

The comparative experiments show that the addition of the copolymers of the invention as anti-misting additives significantly reduces the formation of aerosol by the radiation-curing silicone coating systems in rapid coating operations in both standard formulations.

Example 19

Performance Investigations

For the determination of release force and for the short-term forces of subsequent adhesion, the Finat 10 test (release forces) and Finat 11 test (short-term forces of subsequent adhesion), which are employed within the coatings industry, were used. The substrate employed was the BoPP film (Poly M 514 from Polinas). As a comparative, the standard formulations A and B without inventive additive were used. The additives were either incorporated neat into the silicone formulation, or added as described in the respective example.

Finat FTM 10 Test: Release force test with TESA 7475 adhesive/2.5 cm stored at 40° C. for one day. This test method is based on FINAT FTM #10 (Fédération Internationale des Fabricants et Transformateurs d'Adhésifs et Thermocollants sur Papier et autres Supports, The Hague). The release force or release value is the force required to separate an adhesive strip from a coated release material under defined conditions with a particular angle and particular speed.

Curing test: Determination of short-term force of subsequent adhesion in accordance with Finat FTM 11. This test method is based on FINAT FTM #11 (Fédération Internationale des Fabricants et Transformateurs d'Adhésifs et Thermocollants sur Papier et autres Supports, The Hague).

The results of the performance investigations can likewise be found in Tables 2 and 3.

TABLE 2

Results of performance investigation in standard formulation A

| Example | Reduction of misting in [%] at 1115 m/min | Reduction of misting in [%] at 1571 m/min | Release force | Subsequent adhesion |
|---|---|---|---|---|
| 1 | −15% | 0% | + | + |
| 2 | −86% | −60% | − | + |
| 4 | −92% | −83% | + | ++ |
| 5 | −74% | −33% | ++ | − |
| 6 | −47% | nd*) | ++ | − |
| 7 | −74% | −47% | + | + |
| 8 | −60% | −52% | + | + |
| 9 | −70% | −40% | + | ++ |
| 10 | −74% | −60% | + | + |
| 11 | −58% | −47% | ++ | + |
| 12 | −59% | −37% | + | + |
| 13 | −68% | −40% | ++ | + |
| 14 | −59% | −18% | ++ | − |
| 15 | −55% | −33% | ++ | − |
| 16 | −65% | −43% | ++ | − |
| 17 | −81% | −33% | ++ | + |

*)nd = was not determined

TABLE 3

Results of performance investigation in standard formulation B

| Example | Reduction of misting in [%] at 1115 m/min | Reduction of misting in [%] at 1571 m/min | Release force | Subsequent adhesion |
|---|---|---|---|---|
| 1 | −8% | −17% | + | + |
| 8 | −68% | −44% | ++ | + |
| 9 | −51% | −57% | + | + |
| 10 | −54% | −43% | + | + |
| 11 | −62% | −54% | + | + |
| 12 | −56% | −60% | ++ | + |
| 13 | −47% | −42% | + | − |
| 14 | −35% | −50% | + | − |
| 15 | −33% | −34% | + | − |
| 16 | −53% | −33% | ++ | + |
| 17 | −69% | −54% | ++ | + |

*) nd = was not determined

TABLE 4

| Keys to the evaluation in tables 2 and 3: | | |
|---|---|---|
| Release force: | ++ | No adverse effect |
| | + | Slight adverse effect |
| | − | Adverse effect present |
| Subsequent adhesion: | ++ | No adverse effect |
| | + | Slight adverse effect |
| | − | No adverse effect present |

Example 20

Test of Misting Tendency in a Pilot Plant

The additives of the invention were investigated on a pilot plant of the company Polytype (Fribourg, Switzerland). In these investigations the standard formulation A was applied as a comparative without inventive additive using a 5-roll applicator unit. Then an inventive additive at a concentration of 0.4% w/w was added to the standard formulation A, and coating speeds of between 200 and 1000 m/min were set. Aerosol formation was determined using the Dusttrack Aerosol Monitor Model 8520. Sampling took place between the silicone applicator roll and the roll nip at a distance of 15 cm. The coating weight was determined by means of X-ray fluorescence analysis and amounted to 1.1 g/m$^2$. The results are set out in FIG. 1. In that figure, triangles show values measured for the formulation without additive, and squares show values measured for the formulation with copolymer of example 10 as additive.

The comparative trials on the pilot plant show that the addition of the inventive additive of example 10 significantly reduces the formation of aerosol by the crosslinkable silicone standard formulation, even on the pilot plant at high speeds.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A copolymer of formula (1)

$$[A']_{a'}[B']_{b'}[C']_{c'}[D']_{d'}, \quad (1)$$

where
A' = structural unit of formula (2)

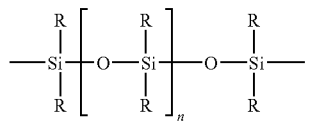
(2)

with n = 2 to 498,
B' = structural unit of formula (3)

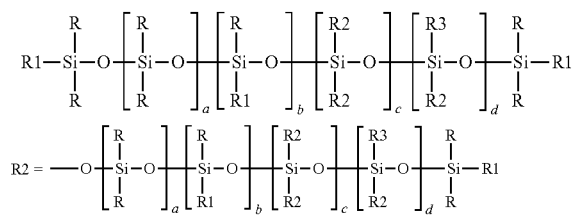
(3)

C' = identical or different structural units of formulae (4) and/or (5)

—CH$_2$—CH$_2$-Q1-CH$_2$—CH$_2$— (4)

—O-Q2-O— (5)

D' = identical or different structural units of formulae (6) and/or (7)

—CH$_2$—CH$_2$-Q1-CH=CH$_2$ (6)

—O-Q2-OH (7)

in which
a independently at each occurrence is 0 to 500,
b independently at each occurrence is 0 to 60,
c independently at each occurrence is 0 to 10,
d independently at each occurrence is 0 to 10, with the proviso that c + d is greater than/equal to 1,
R independently at each occurrence is a radical from the group of linear, cyclic or branched, aliphatic or aromatic, saturated or unsaturated hydrocarbon radicals having from 1 up to 20 C atoms,
R1 independently at each occurrence is a bond to a structural unit or R,
R3 independently at each occurrence is R1 or a heteroatom-substituted, functional, organic, saturated or unsaturated radical,
with the proviso that at least one R1 is a bond to a structural unit and that the average number of T and Q units per structural unit B' is in each case not greater than 20 and the average number of D units per structural unit B' is not greater than 2000,
a', b', c' and d' are indices which indicate the molar fractions of the structural units A' to D' in the compound of the formula (1), and a' is from 20% to 70%, b' is greater than 0% to 20%, c' = 30% to <60%, and d' is greater than/equal to 0%,
Q1 = a bond or an organic radical and
Q2 = an organic radical.

2. The copolymer according to claim 1, wherein the at least one structural unit of formula C' is a structural unit of formula 4 where Q1 is a bond or an organic radical selected from linear, cyclic or branched, aliphatic or aromatic hydrocarbon radicals having 1 to 30 carbon atoms, ester radicals composed of a dicarboxylic acid having 2 to 20 carbon atoms and an alkanol having 3 to 18 carbon atoms,
ester radicals composed of a diol which comprises linear, cyclic or branched, aliphatic or aromatic hydrocarbon radicals having 2 to 30 carbon atoms and a carboxylic acid which carries 1 to 21 carbon atoms,
polyether radicals which optionally contain further heteroatoms, and the heteroatoms optionally have radicals from the group of linear, cyclic or branched, aliphatic or aromatic hydrocarbon radicals having from 1 up to 20 carbon atoms,
radicals carrying polyether groups and amide groups, of formula (8a)

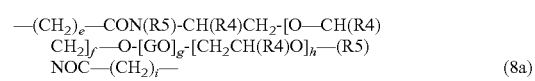
(8a)

where
R4 independently at each occurrence is H, —CH$_3$ or —C$_2$H$_5$,
R5 is the same as for R4,
e and i independently of one another are 0 to 20,
f and h independently of one another are values >1,
g is 0 or 1,
G is an unbranched or branched hydrocarbon radical having 2 to 10 C atoms, the total molar weight of the radical of the formula (8a) is from 100 to 10 000 g/mol, so-called polyether-ester radicals, containing polyether groups and ester groups, of formula (8b)

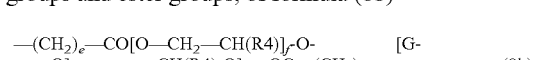
(8b)

where definitions of the abbreviations and indices correspond to those for formula (8a), the polyoxyalkylene radicals having a molar weight of 100 to 5000 g/mol.

3. The copolymers according to claim 1, wherein the at least one structural unit of the formula C' is a structural unit of formula (5), where Q2 is an organic radical selected from hydrocarbon radicals having 2 to 20 carbon atoms, which may optionally be substituted by hydroxyl groups, or is a structural unit of formula (9)

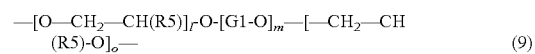
(9)

where R5 independently at each occurrence is H, —CH$_3$ or —C$_2$H$_5$, o and l independently of one another are values greater than or equal to 0, m is at least 1 and G1 is a hydrocarbon radical having 2 to 10 C atoms, the total molar weight of the unit of formula (9) is from 60 to 10 000 g/mol.

4. The copolymer according to claim 1, wherein said copolymer has exclusively structural units of formula (4) as structural units of formula C'.

5. A process for preparing a copolymer, comprising:
reacting components A, B and C, wherein component A is a compound of formula (10)

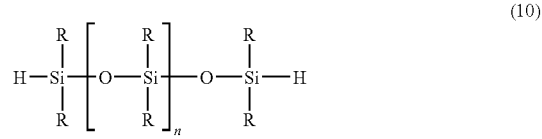
(10)

and with n =2 to 498 and R is independently at each occurrence is a radical from the group of linear, cyclic or branched, aliphatic or aromatic, saturated or unsaturated hydrocarbon radicals having from 1 up to 20 C atoms, component B is a compound of formula (11)

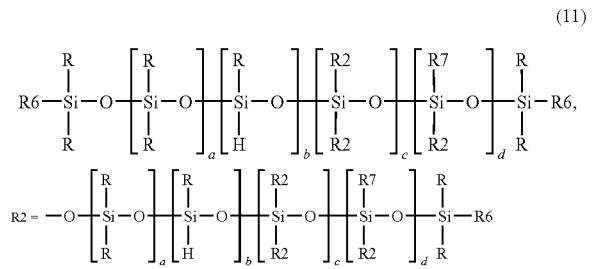

(11)

where
R6 independently at each occurrence is hydrogen or R,
R7 independently at each occurrence is hydrogen, R or a heteroatom-substituted, functional, organic, saturated or unsaturated radical,
R is as defined above,
a independently at each occurrence is 0 to 500,
b independently at each occurrence is 0 to 60,
c independently at each occurrence is 0 to 10,
d independently at each occurrence is 0 to 10, with the proviso that c + d is greater than/equal to 1,
with the proviso that if b =0 then at least one radical R6 or R7=H and that the average number of T and Q units per molecule is in each case not greater than 20, the average number of D units per molecule is not greater than 2000 and the average number of $D^H$ units per molecule is not greater than 100,
and where component C is a compound of formula (12) and/or (13)

  (12)

  (13)

where
Q1 = a bond or an organic radical and
Q2 = an organic radical.

6. The process according to claim 5, wherein component A is used in molar fractions of 20% to less than 70%, component B is used in molar fractions of greater than 0 to 30% and component C is used in molar fractions of 30% to less than 80%, the molar fractions of components A, B and C adding up to 100%.

7. The process according to claim 5, wherein compounds of formula (12) are used exclusively as component C.

8. The process according to claim 5, wherein compounds of formula (12) and compounds of formula (13) are used as component C, the molar ratio of the compounds of the formula (12) to the compounds of the formula (13) is from 1:0.5 to 1:3.

9. The process according to claim 5, wherein said reacting is carried out such that an at least 95% conversion of SiH groups is achieved.

10. The process according to claim 5, wherein said reacting includes a hydrosilylation, said hydrosilylation is carried out using a noble metal catalyst selected from platinum catalysts.

11. The process according to claim 5, wherein said reacting includes a hydrosilylation and dehydrogenative coupling, said hydrosilylation is carried out using a noble metal catalyst selected from platinum catalysts, and said dehydrogenative coupling is carried out using at least one catalyst which comprises at least one of B, Al and Ga.

12. The process according to claim 5 wherein a copolymer of formula (1)

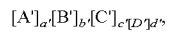  (1)

where
A'=structural unit of formula (2)

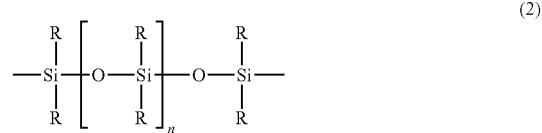  (2)

with n=2 to 498,
B'=structural unit of formula (3)

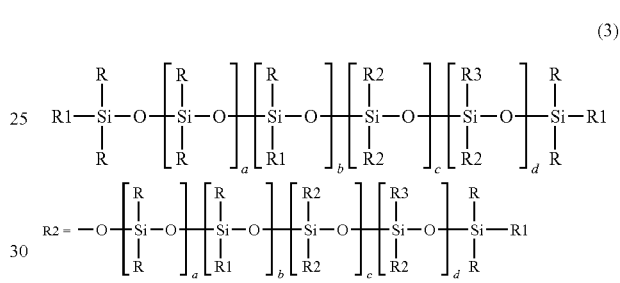  (3)

C'=identical or different structural units of formulae (4) and/or (5)

—CH$_2$—CH$_2$-Q1-CH$_2$—CH$_2$—  (4)

—O-Q2-O—  (5)

D'=identical or different structural units of formulae (6) and/or (7)

—CH$_2$—CH$_2$-Q1-CH=CH$_2$  (6)

—O-Q2-OH  (7)

in which
a independently at each occurrence is 0 to 500,
b independently at each occurrence is 0 to 60,
c independently at each occurrence is 0 to 10,
d independently at each occurrence is 0 to 10, with the proviso that c + d is greater than/equal to 1,
R independently at each occurrence is a radical from the group of linear, cyclic or branched, aliphatic or aromatic, saturated or unsaturated hydrocarbon radicals having from 1 up to 20 C atoms,
R1 independently at each occurrence is a bond to a structural unit or R,
R3 independently at each occurrence is R1 or a heteroatom-substituted, functional, organic, saturated or unsaturated radical,
with the proviso that at least one R1 is a bond to a structural unit and that the average number of T and Q units per structural unit B' is in each case not greater than 20 and the average number of D units per structural unit B' is not greater than 2000,
a', b', c' and d' are indices which indicate the molar fractions of the structural units A' to D' in the compound of the formula (1), and a' is from 20% to 70%, b' is greater than 0% to 20%, c'=30% to <60%, and d' is greater than/equal to 0%,
Q1=a bond or an organic radical and
Q2=an organic radical is prepared.

13. A composition comprising at least one copolymer according to claim 1 and also one or more components A and/or B, wherein component A is a compound of formula (10)

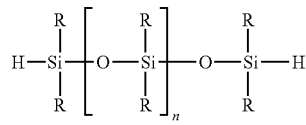
(10)

and with n =2 to 498 and R is independently at each occurrence is a radical from the group of linear, cyclic or branched, aliphatic or aromatic, saturated or unsaturated hydrocarbon radicals having from 1 up to 20 C atoms, and
component B is a compound of formula (11)

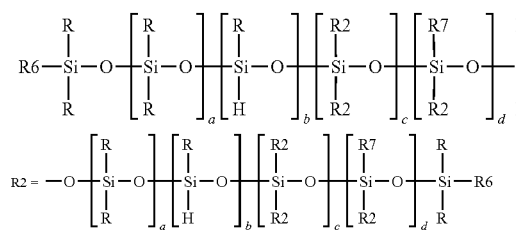
(11)

where
R6 independently at each occurrence is hydrogen or R,
R7 independently at each occurrence is hydrogen, R or a heteroatom-substituted, functional, organic, saturated or unsaturated radical,
R is as defined above,
a independently at each occurrence is 0 to 500,
b independently at each occurrence is 0 to 60,
c independently at each occurrence is 0 to 10,
d independently at each occurrence is 0 to 10, with the proviso that c + d is greater than/equal to 1,
with the proviso that if b=0 then at least one radical R6 or R7=H and that the average number of T and Q units per molecule is in each case not greater than 20, the average number of D units per molecule is not greater than 2000 and the average number of $D^H$ units per molecule is not greater than 100.

14. A silicone release coating having from 0.001% to 5% of at least one copolymer of claim 1.

15. The silicone release coating of claim 14 further comprising one or more components A and/or B, wherein component A is a compound of formula (10)

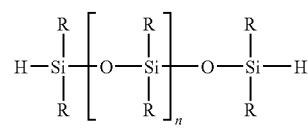
(10)

and with n =2 to 498 and R is independently at each occurrence is a radical from the group of linear, cyclic or branched, aliphatic or aromatic, saturated or unsaturated hydrocarbon radicals having from 1 up to 20 C atoms, and component B is a compound of formula (11)

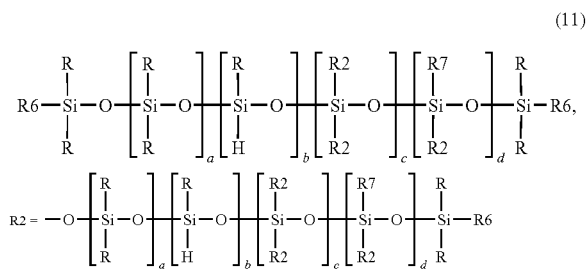
(11)

where
R6 independently at each occurrence is hydrogen or R,
R7 independently at each occurrence is hydrogen, R or a heteroatom-substituted, functional, organic, saturated or unsaturated radical,
R is as defined above,
a independently at each occurrence is 0 to 500,
b independently at each occurrence is 0 to 60,
c independently at each occurrence is 0 to 10,
d independently at each occurrence is 0 to 10, with the proviso that c + d is greater than/equal to 1,
with the proviso that if b=0 then at least one radical R6 or R7=H and that the average number of T and Q units per molecule is in each case not greater than 20, the average number of D units per molecule is not greater than 2000 and the average number of $D^H$ units per molecule is not greater than 100.

* * * * *